(12) United States Patent
Oishi et al.

(10) Patent No.: US 9,807,689 B2
(45) Date of Patent: Oct. 31, 2017

(54) COMMUNICATION DEVICE, METHOD AND COMMUNICATION SYSTEM

(71) Applicant: FUJITSU LIMITED, Kawasaki-shi, Kanagawa (JP)

(72) Inventors: Kazuaki Oishi, Yokohama (JP); Hiroyuki Sato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 127 days.

(21) Appl. No.: 14/868,232

(22) Filed: Sep. 28, 2015

(65) Prior Publication Data
US 2016/0174152 A1 Jun. 16, 2016

(30) Foreign Application Priority Data

Dec. 11, 2014 (JP) ................................. 2014-251248

(51) Int. Cl.
*H04W 52/02* (2009.01)
(52) U.S. Cl.
CPC ... *H04W 52/0225* (2013.01); *H04W 52/0229* (2013.01); *H04W 52/0245* (2013.01); *Y02B 60/50* (2013.01)
(58) Field of Classification Search
None
See application file for complete search history.

(56) References Cited

U.S. PATENT DOCUMENTS

| | | | | |
|---|---|---|---|---|
| 6,735,454 | B1 * | 5/2004 | Yu | H04W 52/0293 455/343.1 |
| 2006/0242328 | A1 * | 10/2006 | Guo | H04L 12/12 709/250 |
| 2007/0248034 | A1 * | 10/2007 | Hsu | H04W 52/028 370/318 |
| 2010/0226359 | A1 * | 9/2010 | van der Wateren | H04J 3/0655 370/350 |
| 2011/0128869 | A1 * | 6/2011 | Coleri Ergen | H04W 56/002 370/252 |
| 2011/0199952 | A1 * | 8/2011 | Seok | H04W 52/0235 370/311 |
| 2013/0044658 | A1 * | 2/2013 | Zhu | H04W 52/0229 370/311 |

FOREIGN PATENT DOCUMENTS

| | | |
|---|---|---|
| JP | 08-307342 A | 11/1996 |
| JP | 09-093185 A | 4/1997 |
| JP | 2001-069107 A | 3/2001 |
| JP | 2004-328501 A | 11/2004 |
| JP | 2010-114671 A | 5/2010 |

* cited by examiner

*Primary Examiner* — Kodzovi Acolatse
(74) *Attorney, Agent, or Firm* — Arent Fox LLP

(57) ABSTRACT

A communication device includes a receiving circuit and a start-up time adjustment circuit configured to transmit, to the receiving circuit, a start signal that instructs a change from a sleep state to an active state, wherein the start-up time adjustment circuit is configured to transmit, to the receiving circuit, a first start signal that instructs a change from the sleep state to the active state at a first time earlier than a second time when a first signal reaches the communication device, measure a first time difference between the second time and the first time, determine, based on the first time difference, a third time when the receiving circuit is changed from the active state to the sleep state, and transmit a second start signal that instructs a change from the sleep state to the active state to the receiving circuit at the third time.

13 Claims, 18 Drawing Sheets

COMMUNICATION DEVICE, METHOD AND COMMUNICATION SYSTEM

CROSS-REFERENCE TO RELATED APPLICATION

This application is based upon and claims the benefit of priority of the prior Japanese Patent Application No. 2014-251248, filed on Dec. 11, 2014, the entire contents of which are incorporated herein by reference.

FIELD

The embodiments discussed herein are related to a communication device, a method, and a communication system.

BACKGROUND

In recent years, a wireless network in which a terminal (a receiving device, a communication device) switches between an active state and a sleep state, based on a transmission wave (a beacon) transmitted from a base station (a transmitting device), and an operation is intermittently performed has been proposed. Such a wireless network in which an intermittent operation is performed is used for, for example, a wireless network for a sensor, power consumption of which is desired to be reduced, and the like.

In wireless communication, transmission and reception of data are wirelessly performed between a transmitting device and a receiving device and, in many cases, when such transmission and reception of data are performed, the receiving device is driven by a battery. When the receiving device is driven by a battery, it is desired to reduce power consumption to thereby increase the lifetime of the battery and reduce the frequency of replacement or charge of the battery.

Therefore, the receiving device is configured to perform an intermittent operation in which a related circuit (a transmitting and receiving circuit) is put in an active state only when reception or transmission of a signal is performed, and other than that, the circuit is put in a sleep state that is a low-power consumption state.

That is, in wireless communication, a period of an active state in which reception or transmission of data is performed is far shorter than a period of a sleep state in many cases. Therefore, it is enabled to reduce average power consumption in the receiving device by controlling an active state and a sleep state, based on a beacon transmitted from the transmitting device.

Incidentally, up until now, various methods for performing control of a receiving device that receives a transmission wave, based on a transmission wave intermittently transmitted from a transmitting device, have been proposed. Japanese Laid-open Patent Publication No. 08-307342, Japanese Laid-open Patent Publication No. 2004-328501, Japanese Laid-open Patent Publication No. 09-093185, Japanese Laid-open Patent Publication No. 2010-114671, and Japanese Laid-open Patent Publication No. 2001-069107 discuss related art.

SUMMARY

According to an aspect of the invention, a communication device which receives a plurality of signals transmitted at time intervals, the communication device includes a receiving circuit configured to receive the plurality of signals, and a start-up time adjustment circuit configured to transmit, to the receiving circuit, a start signal that instructs a change from a sleep state to an active state, wherein the start-up time adjustment circuit is configured to transmit, to the receiving circuit, a first start signal that instructs a change from the sleep state to the active state at a first time earlier than a second time when a first signal among the plurality of signals reaches the communication device, measure a first time difference between the second time and the first time, determine, based on the first time difference, a third time that is a time after a time when the receiving circuit is changed from the active state to the sleep state, and transmit a second start signal that instructs a change from the sleep state to the active state to the receiving circuit at the third time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Conventionally, for example, average power consumption in a receiving device is reduced by controlling an active state and a sleep state of the receiving device, for example, based on a beacon transmitted from a transmitting device.

For example, when a receiving device is applied to a wireless network for a sensor, or the like, normally, reduction in price is desired to be achieved for the receiving device, and therefore, as a timer that determines a timing at which a beacon is transmitted, for example, an inexpensive timer that does not use a crystal resonator but uses an LC resonance is preferably used. Furthermore, when a receiving device is applied to a wireless network for a sensor, or the like, as the receiving device, a receiving device with a reduced size is desired, and therefore, use of a simple timer is preferably used in view of such downsizing as well.

However, for example, since an inexpensive timer using an LC resonance has lower time measurement accuracy than that of a timer using a crystal resonator, a receiving device is started up such that, even when a large measurement error occurs, the receiving device may receive a beacon, and a margin is allowed for a timing at which the receiving device is put in an active state.

However, when the margin is increased to advance a start-up timing of the receiving device, an active state is increased. Power consumption of the receiving device in the active state is greater than that in a sleep state, and therefore, margin setting for a timing of a start up of the receiving device is difficult under the existing conditions.

That is, increasing a sleep state and thus delaying a start-up of the receiving device to a time immediately before reception of a beacon for the purpose of reducing power consumption, and increasing a margin of a start-up of the receiving device for the purpose of allowing plenty of time to receive a beacon are in a trade-off relationship. Therefore, it is difficult to increase a sleep state of the receiving device and thus reduce power consumption, while using a timer with low time measurement accuracy for the receiving device.

First, before describing a communication device, a transmitting and receiving system, and a method for controlling a communication device according to an embodiment, an example of a reception control method in a transmitting and receiving system and a problem thereof will be described with reference to FIG. 1 and FIG. 2.

Figure 1:
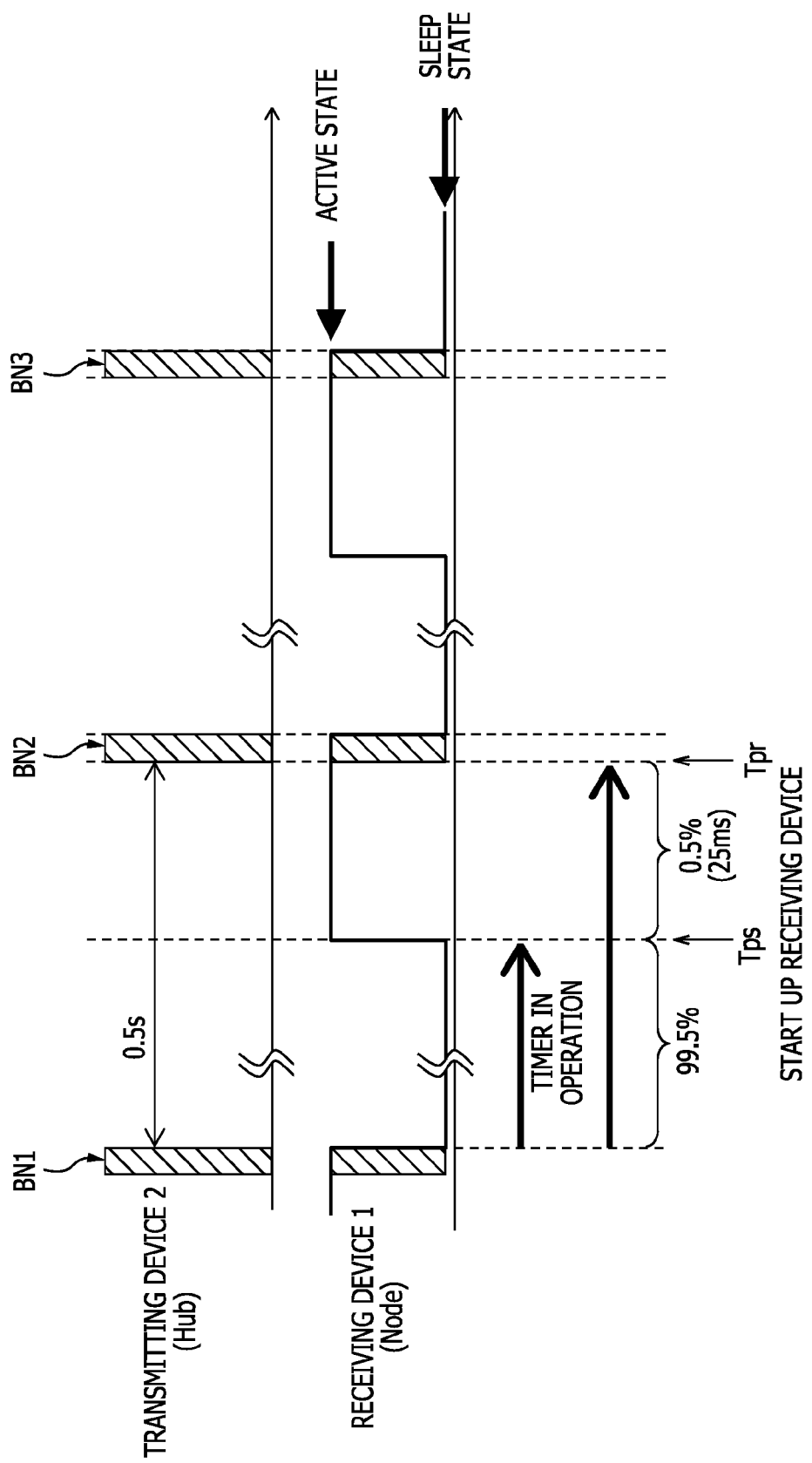
FIG. 1 is a diagram illustrating an example of a reception control method in a transmitting and receiving system.
Figure 2:
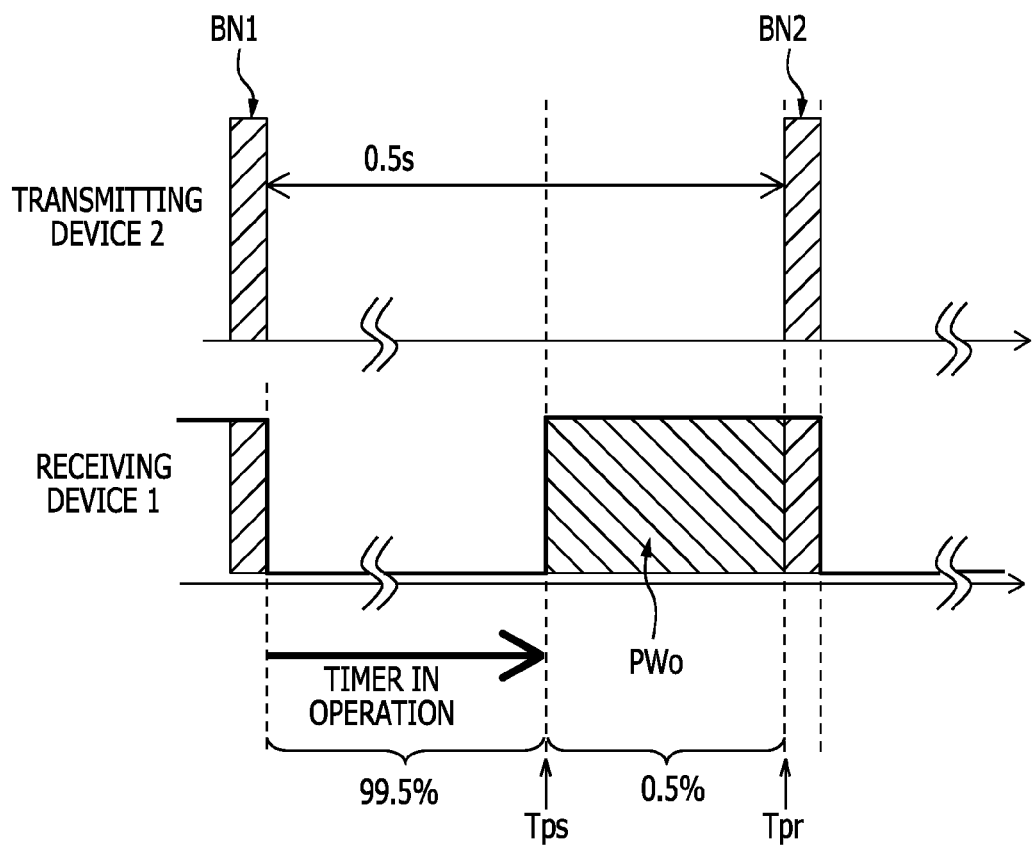
FIG. 2 is a chart illustrating a problem in the reception control method illustrated in FIG. 1.

FIG. 1 is a diagram illustrating an example of a reception control method in a transmitting and receiving system, and FIG. 2 is a chart illustrating a problem in the reception control method illustrated in FIG. 1. FIG. 1 and FIG. 2 illustrate an example where transmission waves (beacons) BN1, BN2, . . . are intermittently output from a transmitting device 2 to a receiving device 1 in a cycle of 0.5 seconds.

Note that the transmitting device 2 herein is a transmitting device in terms of transmitting a beacon and, for example, corresponds to a base station (Hub) in a wireless network for a sensor. Also, the receiving device 1 herein is a receiving device in terms of receiving a beacon and, for example, corresponds to a terminal (Node) in a wireless network for a sensor.

Therefore, the base station (a transmitting device) 2 not only transmits a beacon to a plurality of terminals (a receiving device, a communication device) 1 but also performs mutual communication including reception of data acquired by a sensor in each of the terminals 1, and transmission and reception of a control signal. Also, the terminal 1 not only receives a beacon transmitted from the base station 2 but also performs mutual communication including transmission of data to another terminal 1 and transmission and reception of a control signal.

Furthermore, in FIG. 1, for example, a beacon interval from an end of transmission of a first beacon BN1 to a start of transmission of a second beacon BN2 is illustrated as a cycle, and this does not cause any problem because a time during which a beacon is transmitted is relatively short, as compared to the beacon cycle. Also, the cycle of the beacons BN1, BN2, . . . that are intermittently transmitted is not limited to 0.5 seconds and, for example, may be various cycles of several seconds to several days, depending on a use application of the system.

As illustrated in FIG. 1, in the receiving device 1, for example, using a timer, the receiving device (a receiving circuit or the like) 1 is started up from a sleep state to an active state at a time Tps so as to be able to receive the beacon BN2 that is transmitted from the transmitting device 2 at intervals of 0.5 seconds (in an intermittent cycle).

In this case, the receiving device 1 is applied to a wireless network for a sensor, or the like, power consumption of which is desired to be reduced but, normally, there are cases where an inexpensive timer (a clock generation circuit) using an LC resonance, or a simple timer that realizes downsizing is used. Note that, in the following description, a case where an error caused by a timer is 0.5% at maximum is assumed.

That is, assuming that an error caused by a timer is 0.5% at maximum, for example, when an intermittent cycle of 0.5 seconds is measured, an error of 0.5 seconds×0.005=0.0025 seconds (2.5 milliseconds) at maximum occurs.

Therefore, for example, there is a possibility that, unless, assuming that the timer is delayed by 0.5% (2.5 milliseconds), as a setting value (a standard value), the receiving device 1 is started up so as to be in an active state at a timing only 2.5 milliseconds earlier than a beacon reception timing Tpr assumed by the timer, reception of the beacons BN2, BN3, . . . is disabled.

As a result, as illustrated in FIG. 2, the receiving device 1 is in a sleep state for 99.5%, that is, 0.4975 seconds, of 0.5 seconds of an interval (one beacon cycle) in which a beacon is output, and is in an active state for 2.5 milliseconds.

Accordingly, in FIG. 2, during a time from the timing Tps at which the receiving device 1 is started up to be in an active state to the timing Tpr at which the beacon BN2 is received, power PWo consumed by the receiving device 1 is wasted.

As described above, state control of a receiving device (a terminal, the communication device) is performed, for example, with reference to a timer mounted in the terminal but, when time accuracy of the timer is poor, the terminal is put in an active state with a large margin, so that power is consumed to waste.

Figure 3:
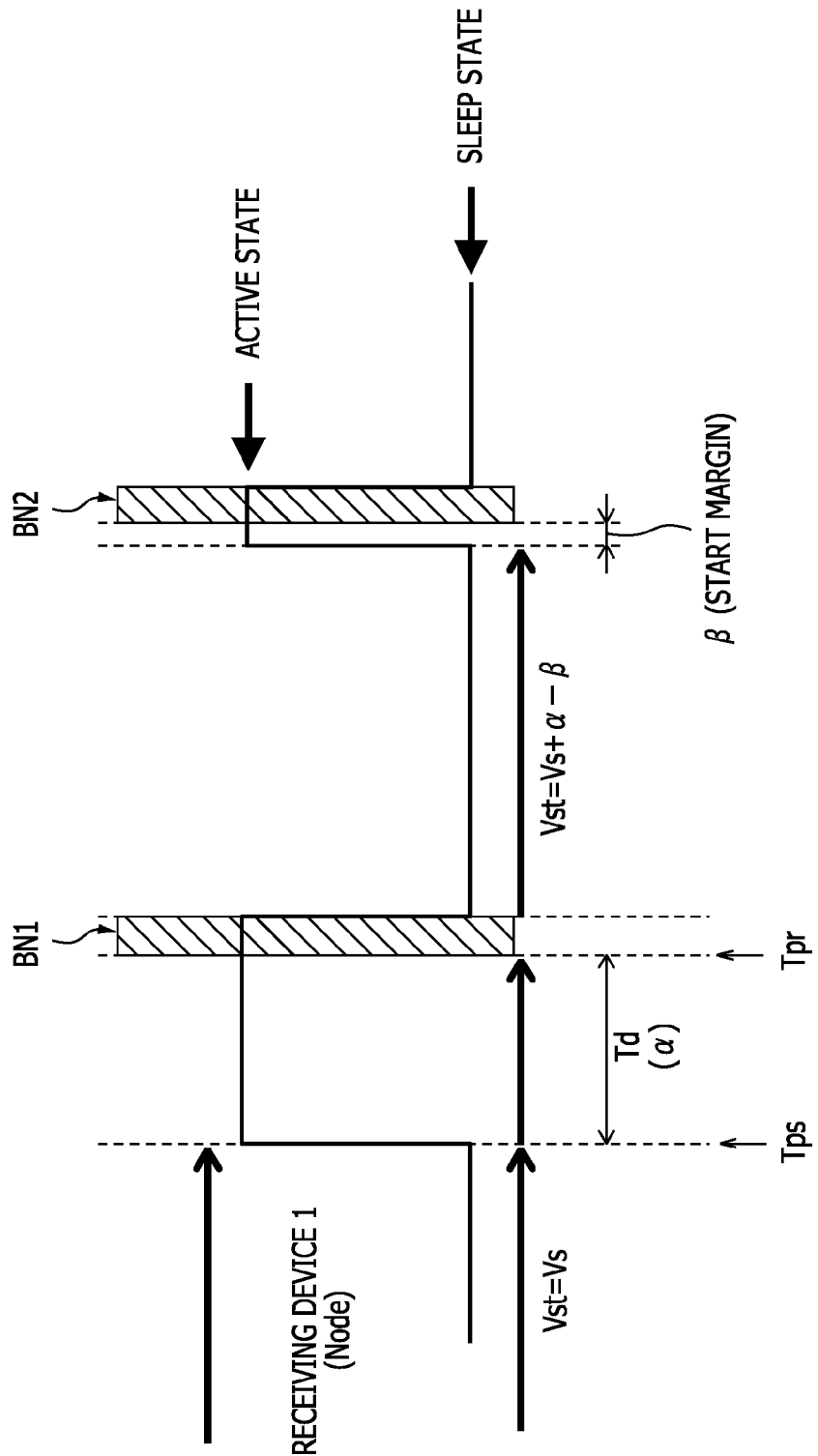
FIG. 3 is a chart illustrating a reception control method according to an embodiment.

Examples of a communication device, a transmitting and receiving system, and a method for controlling a communication device will be described below with reference to the accompanying drawings. FIG. 3 is a chart illustrating a reception control method (a method for controlling a communication device) according to this embodiment, and illustrates an example in which transmission waves (beacons) BN1, BN2, . . . are intermittently output from the transmitting device (Hub) 2 of a base station or the like to the receiving device (Node) 1 of a terminal, a communication device, or the like, in a cycle of 0.5 seconds.

As illustrated in FIG. 3, first, for example, assuming that, when a first beacon BN1 of a target period is received, an intermittent cycle of the beacons is Trx, a maximum error of a timer is $\Delta$Ttm, and a timer setting value is Vst, the reception control method according to this embodiment may be represented by an expression below.

Note that, when the first beacon BN1 is received, the timer setting value Vst is the same as, for example, a timer setting initial value Vs that is given as an initial value.

$$Vst = Vs$$
$$= Trx - \Delta Ttm$$
$$= 0.5 \text{ seconds} - 0.5 \text{ seconds} \times 0.005$$
$$= 0.4975 \text{ seconds}$$

As described above, the timer setting value (a sleep time) when the first beacon BN1 is received is, for example, 0.4975 seconds. Accordingly, the timing (a start-up time) Tps at which the receiving device 1 is put in an active state is 0.0025 seconds, that is, 2.5 milliseconds earlier, which is the same as that described with reference to FIG. 1 and FIG. 2, than the timing (a beacon reception time) Tpr at which the beacon BN1 is received. Therefore, the power consumption of the receiving device 1 when the first beacon BN1 is received is the same as that described with reference to FIG. 1 and FIG. 2.

In this case, when the first beacon BN1 is received, a time from a timing at which the receiving device 1 is put in an active state to a timing at which the beacon BN1 is actually received is measured. That is, when the first beacon BN1 is received, a time Td from the start-up time Tps of the receiving device 1 to the beacon reception time Tpr is counted. Assume that this counter value (an offset value) is α.

Next, when a second beacon BN2 is received, a sleep time of the receiving device 1 is corrected based on the time Td (α) from the start-up time Tps of the receiving device 1 to the beacon reception time Tpr, when the first beacon BN1 is received.

That is, when the second beacon BN2 is received, the timer setting value Vst is corrected by the offset value α from the start-up time Tps of the receiving device 1 to the beacon reception time Tpr, when the first beacon BN1 is received. This may be represented by an expression below.

$$Vst=Vs+\alpha$$

In this case, for example, assuming that a margin until plenty of time is allowed for the receiving device 1 to receive a beacon (BN2) after a reception start signal Srs was output to the receiving device 1 is β, the timer setting value Vst when the second beacon BN2 is received may be represented by an expression below.

$$Vst=Vs+\alpha-\beta$$

Note that, for the timer setting value Vst when third and subsequent beacons BN3, BN4, . . . are received, the timer setting value at a second beacon reception time may be used as it is, but also, may be corrected each time using the offset value α and the margin β at an immediately previous reception time. Note that, as will be described later, this embodiment is applicable in a case where a beacon interval is changed, and the like.

As described above, according to a reception control method of this embodiment, at the second and subsequent beacon reception times, for example, similar to a case where a highly accurate timer using a crystal resonator is used, highly accurate start-up control of the receiving device 1 is enabled, so that reduction in power consumption is enabled.

Note that, even when a highly accurate timer using a crystal resonator is used, further increase in sleep time and further reduction in power consumption may be enabled by applying this embodiment.

Figure 4:
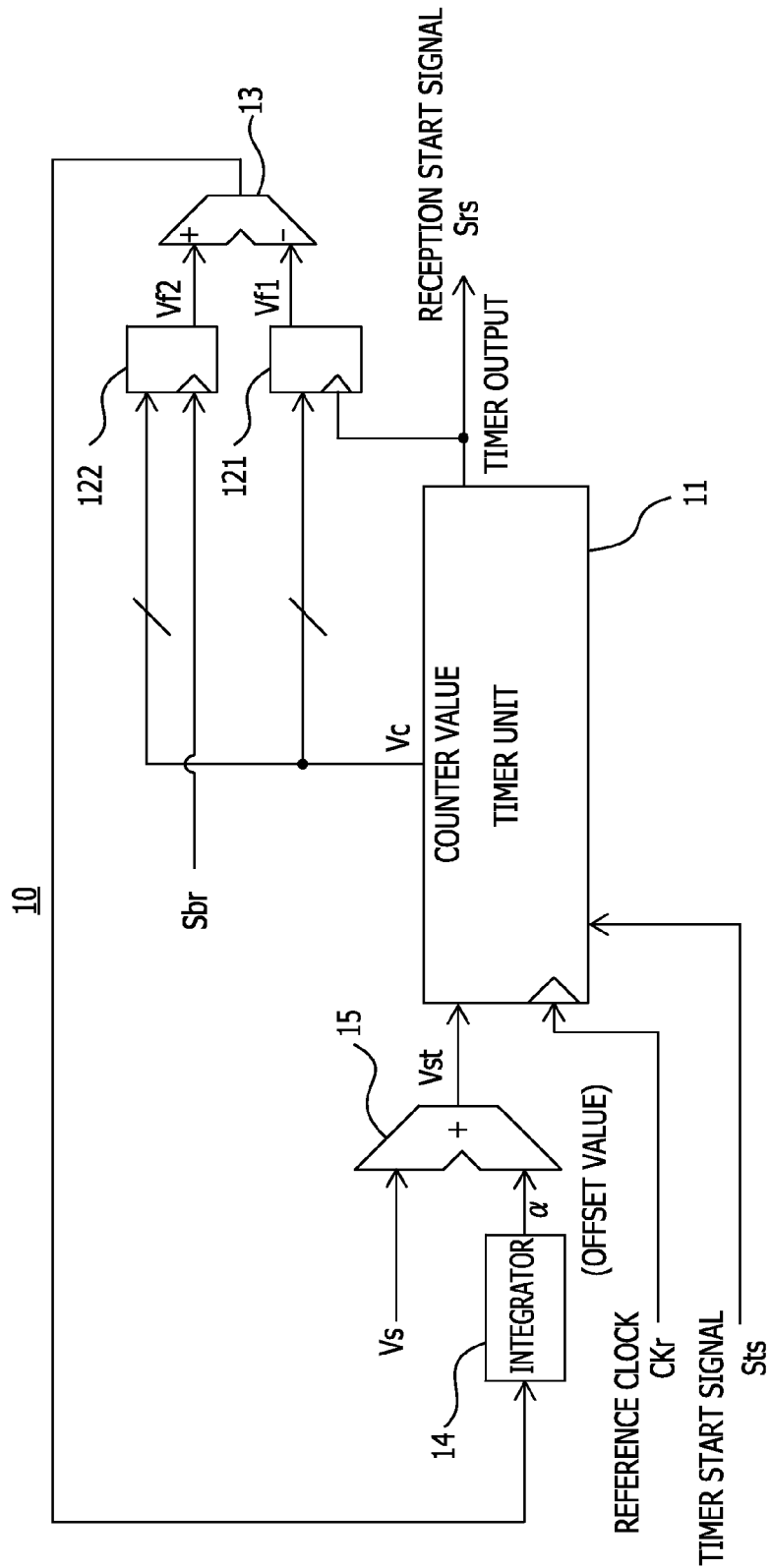
FIG. 4 is a block diagram illustrating a start-up adjustment circuit of a receiving device in a first embodiment.

FIG. 4 is a block diagram illustrating a start-up adjustment circuit of a receiving device in a first embodiment. Note that, as will be illustrated in FIG. 18 later, the receiving device (the terminal) 1 includes an internal circuit 100, such as, for example, a transmitting circuit, a receiving circuit, a signal processing circuit, and the like, and a start-up time adjustment circuit 10 that controls an operation (sleep and active) of the internal circuit 100.

In this case, the start-up time adjustment circuit 10 realizes the above-described expression "Vst=Vs+α" and starts up the internal circuit 100 (the receiving device 1) from a sleep sate a predetermined time earlier than a reach time of each of the transmission waves BN1, BN2, . . . that are intermittently transmitted.

As illustrated in FIG. 4, the start-up time adjustment circuit 10 includes a timer unit (a timer) 11, two flip-flops (FF) 121 and 122, a subtractor 13, an integrator 14, and an adder 15.

The timer unit 11 receives a reference clock CKr, a timer start signal Sts, and a timer setting value Vst, counts the reference clock CKr, and outputs a reception start signal (a timer output) Srs that starts up the receiving device 1 (the internal circuit 100).

One of the two FFs, that is, the FF (a first latch) 121, takes in a counter value Vc output from the timer unit 11 with the reception start signal Srs and holds the counter value Vc. The other one of the two FFs, that is, the FF (a second latch) 122, takes in the counter value Vc output from the timer unit 11 with a beacon reception signal (a transmission wave reception signal) Sbr and holds the counter value Vc.

The subtractor 13 subtracts an output Vf1 of the first latch 121 from an output Vf2 of the second latch 122, and outputs a result of the subtraction to the integrator 14. The integrator 14 integrates an output of the subtractor 13 to generate an offset value (a counter value) α, and outputs the generated offset value α to the adder 15. That is, the offset value α is averaged by the integrator 14, and the averaged offset value α is input to the adder 15.

The adder 15 receives a timer setting initial value Vs, adds the offset value α to the timer setting initial value Vs, and outputs a result of the addition as the timer setting value Vst that is used at a next beacon reception time to the timer unit 11. In this case, the timer setting initial value Vs is used as the timer setting value Vst in an initial state (when a first beacon BN1 is received), and corresponds to a sleep time in receiving the first beacon BN1.

Figure 5:
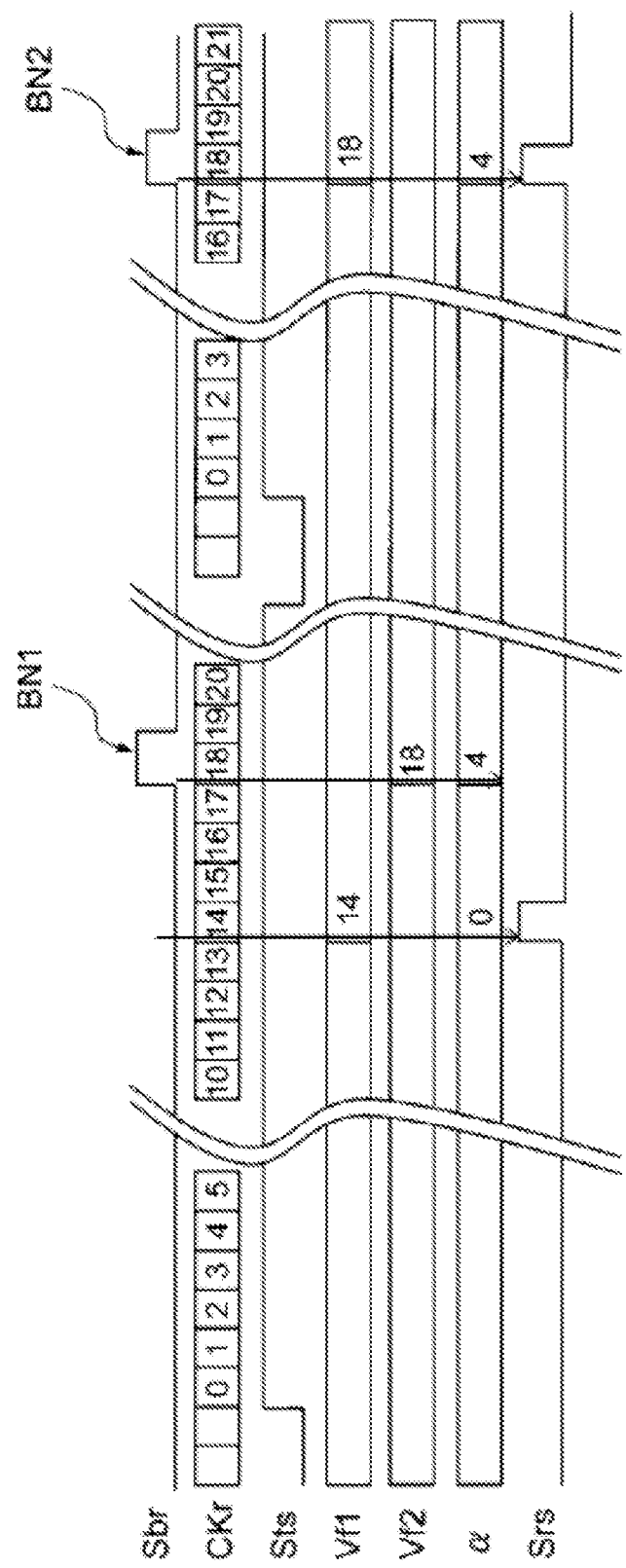
FIG. 5 is a chart illustrating an operation of the start-up time adjustment circuit illustrated in FIG. 4.

FIG. 5 is a chart illustrating an operation of the start-up time adjustment circuit illustrated in FIG. 4, and illustrates a case where Vs=14 and α=4. As illustrated in FIG. 5, when the first beacon BN1 is received, the timer unit 11 in the start-up time adjustment circuit 10 of the receiving device 1 counts the timer setting value Vst (=14), which is output from the adder 15 and is the same as the timer setting initial value Vs. Then, when the timer unit 11 counts the same value as the timer setting value Vst, the timer unit 11 outputs the reception start signal Srs. That is, the reception start signal Srs is caused to rise from a low level "L" to a high level "H".

In this case, the first latch 121 takes in the counter value Vc output from the timer unit 11 at output (at a rising timing) of the reception start signal Srs, and inputs an output Vf1 (=14) thereof to the subtractor 13. The second latch 122 takes in the counter value Vc output from the timer unit 11 at a rising timing of a beacon reception signal Sbr, and inputs an output Vf2 (=18) thereof to the subtractor 13.

The subtractor 13 subtracts the output Vf1 of the first latch 121 from the output Vf2 of the second latch 122, and outputs a result (18−14=4) of the subtraction to the integrator 14. The integrator 14 integrates an output of the subtractor 13 to generate an offset value α (=4), and outputs the generated offset value α to the adder 15.

The adder 15 adds the offset value α (=4) to the timer setting value Vst (=14) of the timer setting initial value Vs (when the first beacon BN1 is received), and outputs the timer setting value Vst (=18) that is used when the next second beacon BN2 is received to the timer unit 11.

Thus, a sleep time until the second beacon BN2 is received is increased to a time based on the timer setting value Vst (=18), which is longer than the timer setting initial value Vs (=14), and thereby, reduction in power consumption is enabled.

Figure 6:
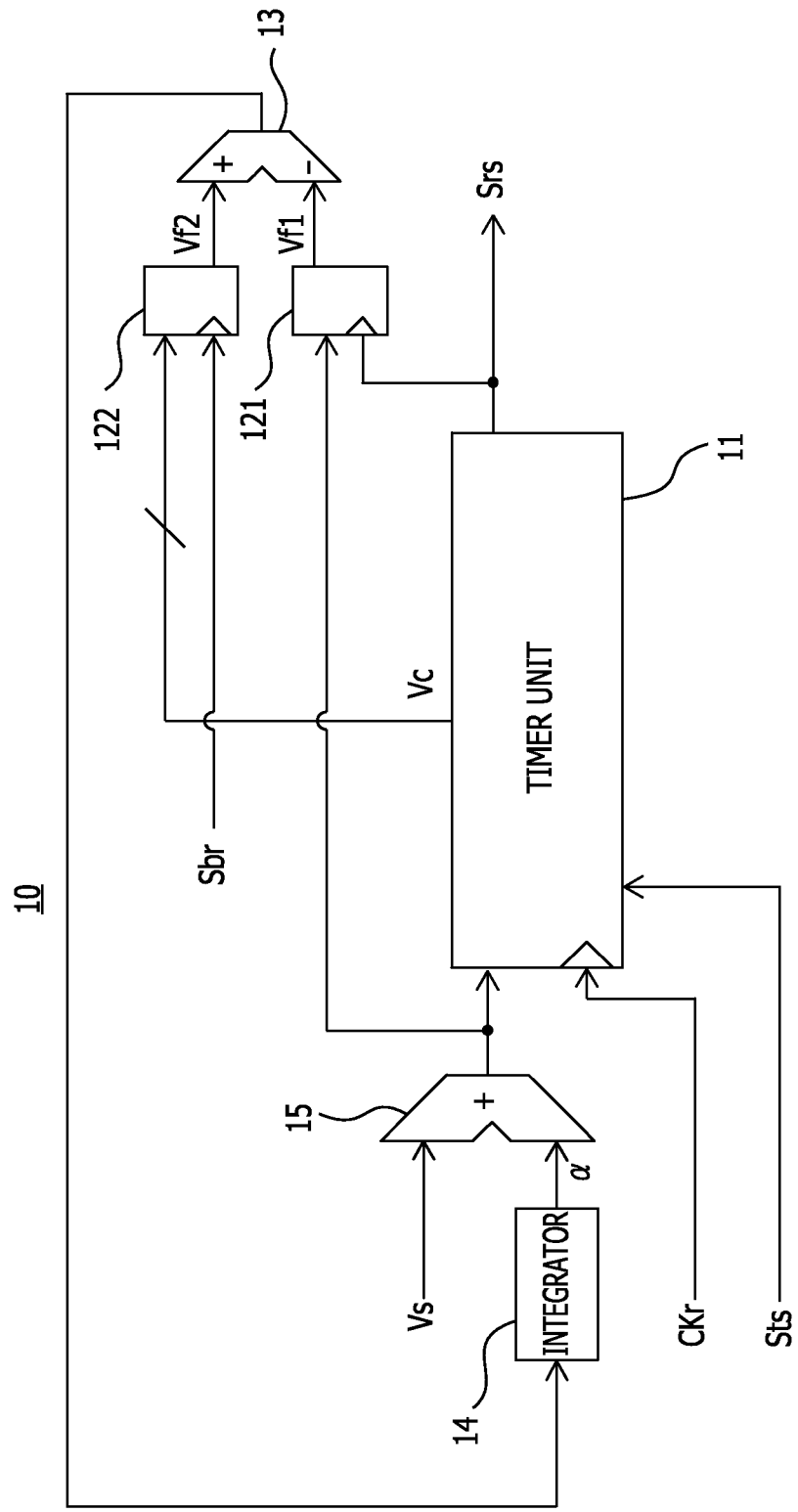
FIG. 6 is a block diagram illustrating a start-up adjustment circuit of a receiving device in a second embodiment.
Figure 7:
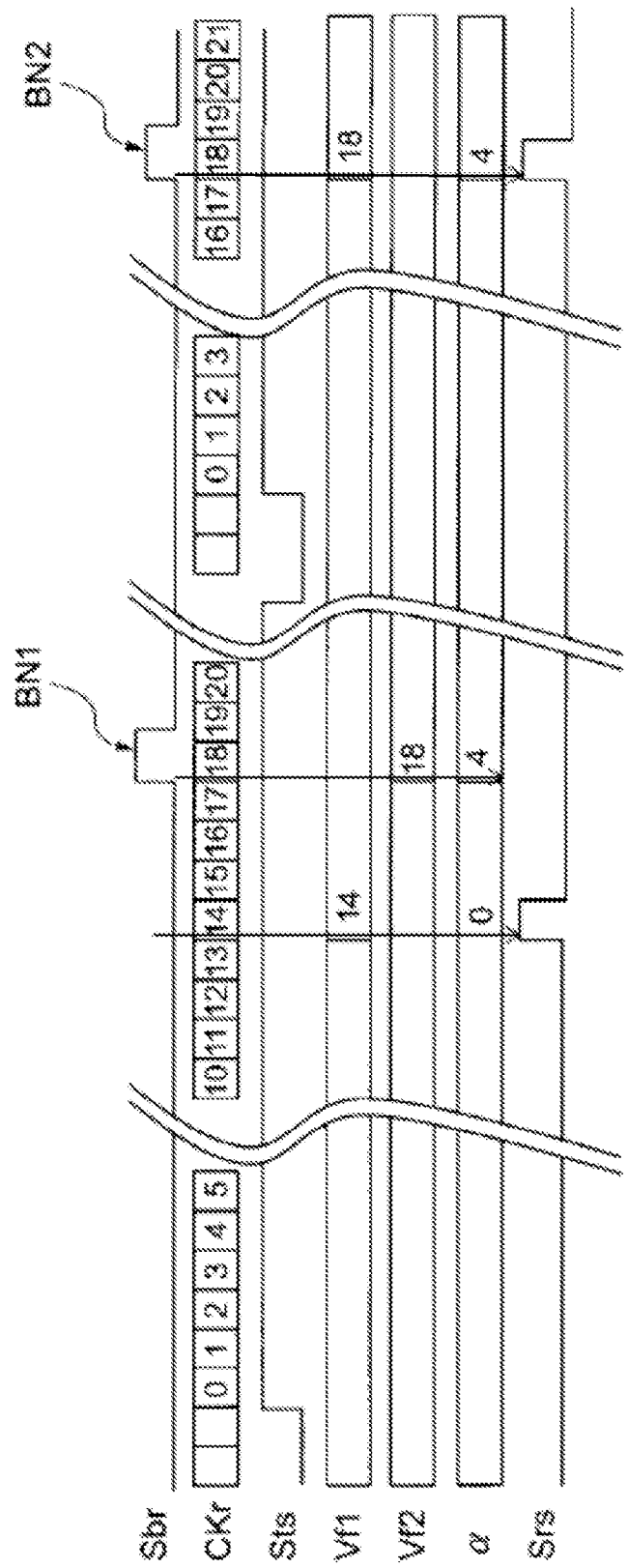
FIG. 7 is a chart illustrating an operation of the start-up time adjustment circuit illustrated in FIG. 6.

FIG. 6 is a block diagram illustrating a start-up adjustment circuit of a receiving device in a second embodiment, and FIG. 7 is a chart illustrating an operation of the start-up time adjustment circuit illustrated in FIG. 6. As clearly indicated by a comparison of FIG. 6 with FIG. 4 described above, in the second embodiment, instead of the counter value Vc output from the timer unit 11, an output (a timer setting value Vst) of the adder 15 is input to the first latch 121.

Note that FIG. 7 is similar to FIG. 5 described above and, also in the start-up time adjustment circuit of the second embodiment illustrated in FIG. 6, similar to the first embodiment, a sleep time until the second beacon BN2 is received is increased to the timer setting value Vst=18, and thereby, reduction in power consumption is enabled.

Figure 8:
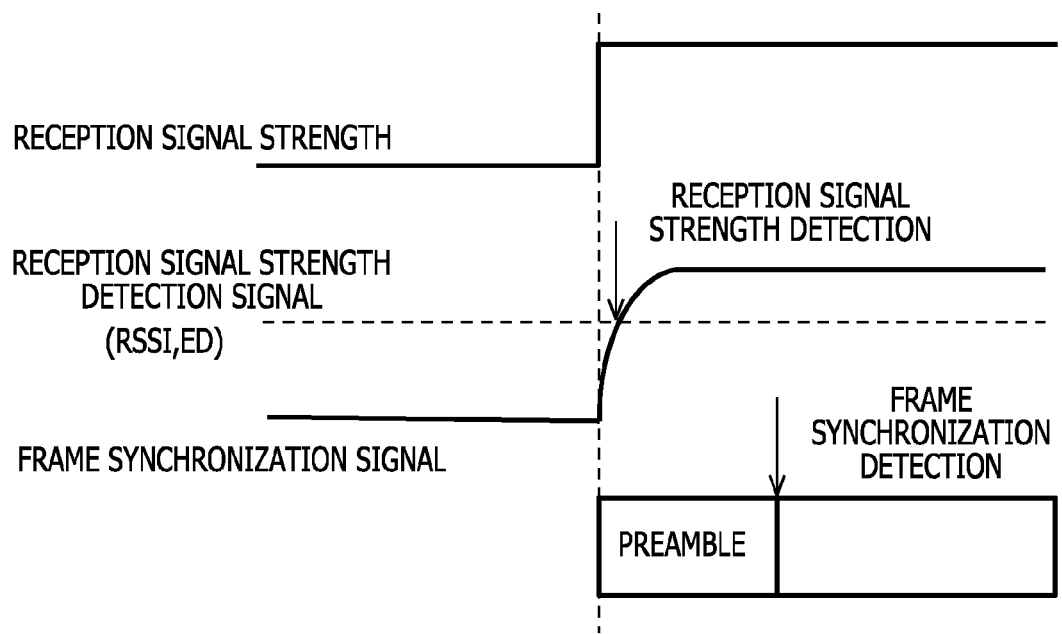
FIG. 8 is a chart illustrating an example of a beacon reception signal.

FIG. 8 is a chart illustrating an example of a beacon reception signal. As illustrated in FIG. 8, as a beacon reception signal Sbr (reception signal strength), for example, an output signal of a received signal strength indicator (RSSI) or an energy detector (ED), or a frame synchronization signal may be used.

That is, the receiving device 1 normally has a function of detecting the strength of a reception radio wave, and is capable of generating a beacon reception signal Sbr in response to an output of an RSSI exceeding a certain level, an output of an ED, or a frame synchronization detection signal obtained by modulating a reception signal.

Furthermore, for example, in order not to output the beacon reception signal Sbr due to noise disturbance by mistake, a logical product of an output of the RSSI and a frame synchronization detection signal of the ED is obtained, and thus, a beacon reception signal Sbr is generated, so that reliability may be increased.

Figure 9:
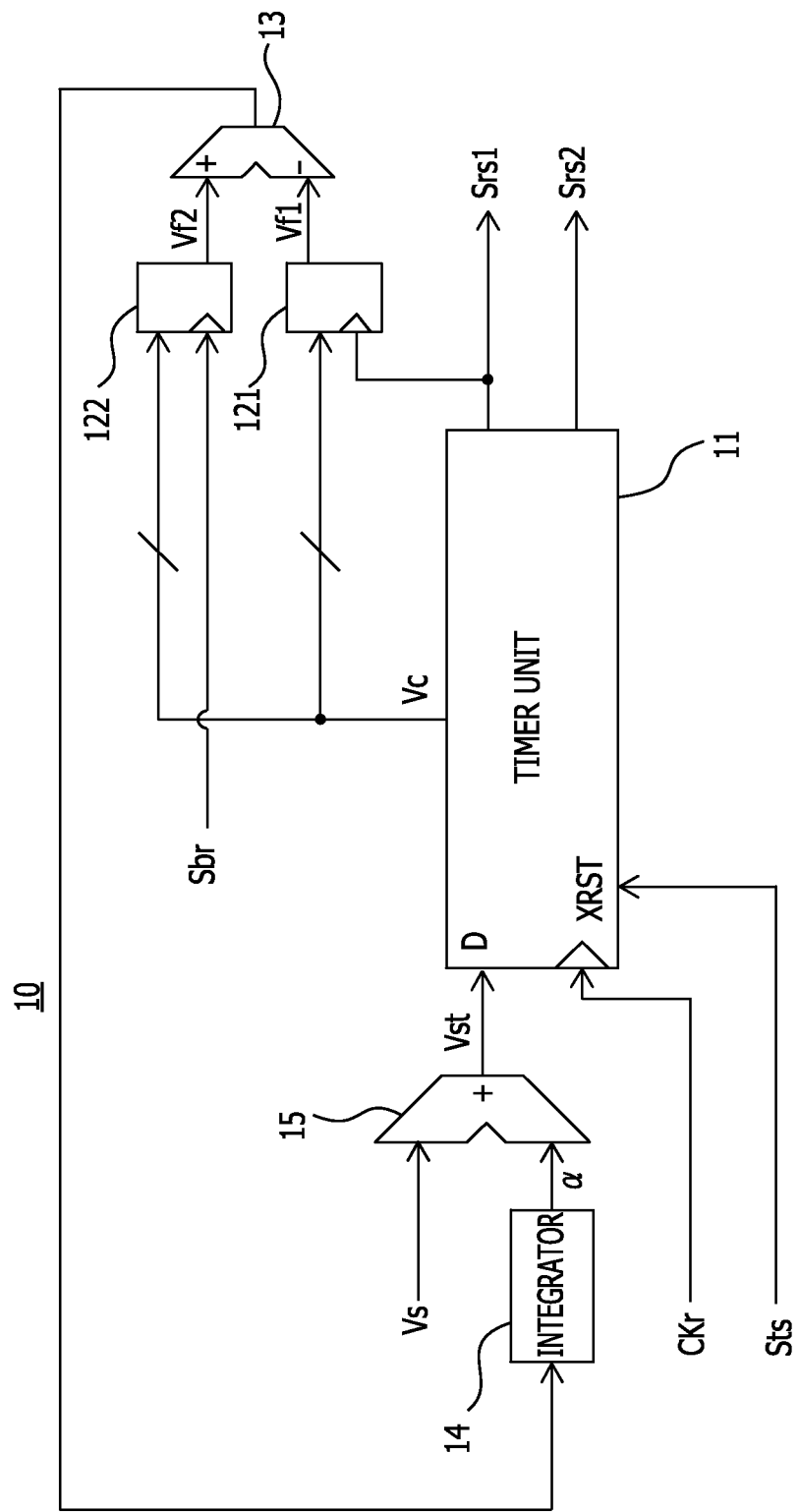
FIG. 9 is a block diagram illustrating a start-up time adjustment circuit of a receiving device in a third embodiment.
Figure 10:
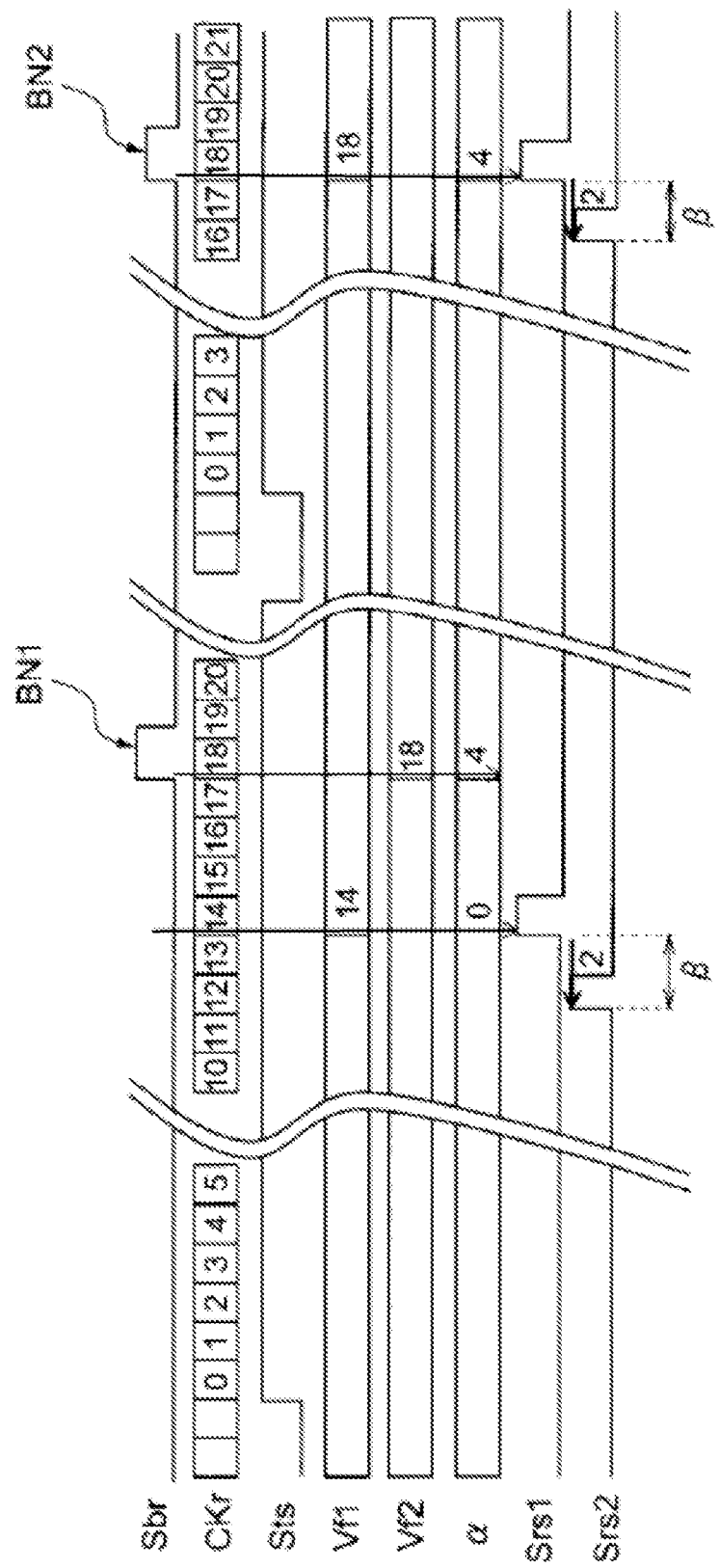
FIG. 10 is a chart illustrating an operation of the start-up time adjustment circuit illustrated in FIG. 9.

FIG. 9 is a block diagram illustrating a start-up time adjustment circuit of a receiving device in a third embodiment, and FIG. 10 is a chart illustrating an operation of the start-up time adjustment circuit illustrated in FIG. 9. As clearly indicated by a comparison of FIG. 9 with FIG. 4 described above, in the third embodiment, two signals Srs1 and Srs2 are output from the timer unit 11. In this case, the timer output signal Srs1 corresponds to, for example, the reception start signal Srs in FIG. 4.

That is, as illustrated in FIG. 7, the signal (a reception start signal of the third embodiment) Srs2, for example, rises two clocks of the reference clock CKr earlier than the signal Srs1, and the two clocks correspond to a margin β.

This is because, for example, in a case where a sleep time until the second beacon BN2 is received is merely obtained as the timer setting value Vst=Vs+α, if a beacon BN is received earlier due to various changes, it is not possible to receive the beacon, and therefore, a predetermine margin β is provided.

That is, for example, a sleep time until the second beacon BN2 is received is obtained based on Vst=Vs+α−β, and thus, although power consumption is comparatively increased, plenty of time may be allowed to receive the beacon BN2.

Figure 11:
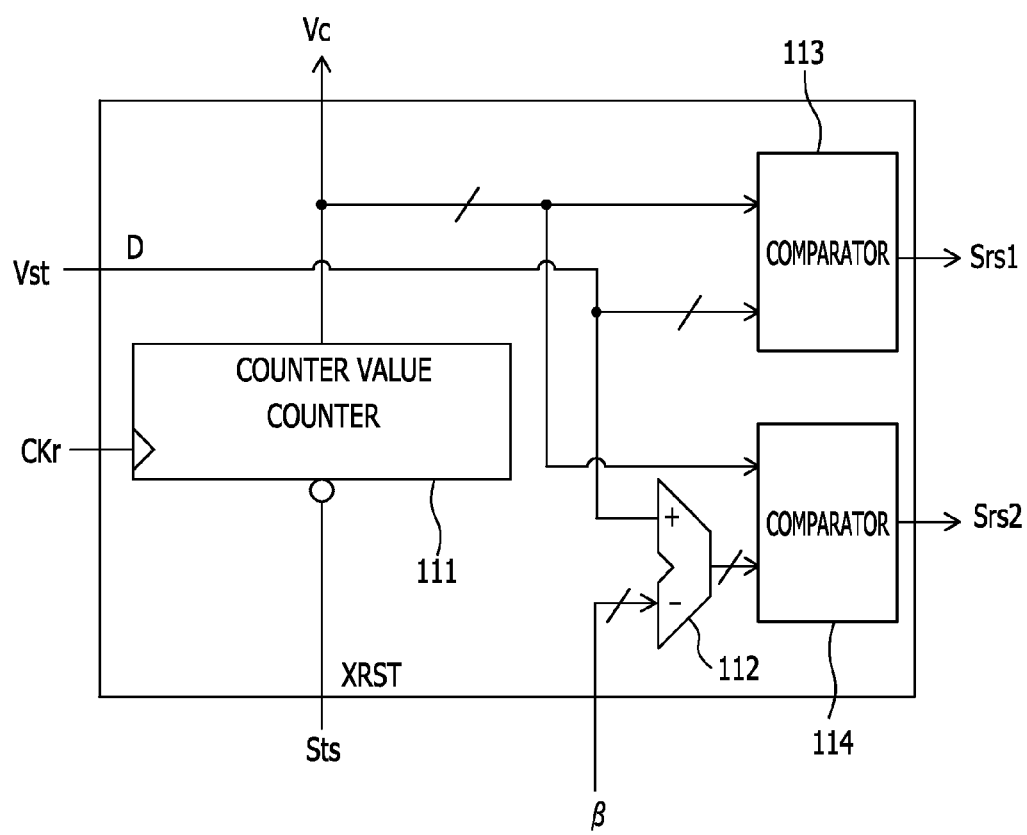
FIG. 11 is a block diagram illustrating a timer unit in the start-up time adjustment circuit illustrated in FIG. 9.
Figure 12:
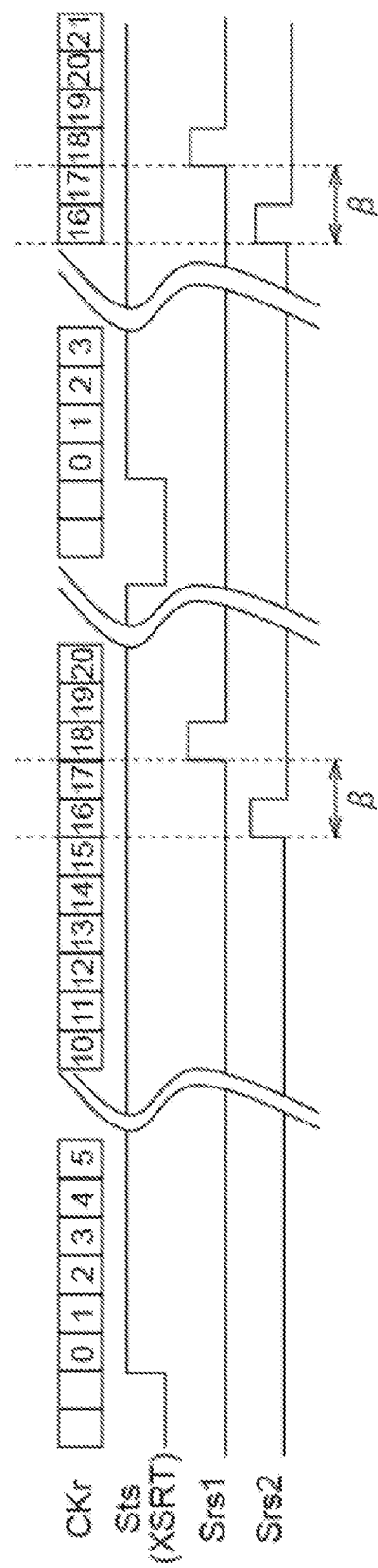
FIG. 12 is a chart illustrating an operation of the timer unit illustrated in FIG. 11.

FIG. 11 is a block diagram illustrating a timer unit in the start-up time adjustment circuit illustrated in FIG. 9, and FIG. 12 is a chart illustrating an operation of the timer unit illustrated in FIG. 11. As illustrated in FIG. 11, the timer unit 11 includes a counter 111, a subtractor 112, and comparators 113 and 114.

In this case, a timer start signal Sts is input to a reset terminal (an inverting input terminal) XRST of the counter 111 and, when the timer start signal Sts falls from "H" to "L", a counter value is reset. Then, when the timer start signal Sts rises from "L" to "H" next, a count based on the reference clock CKr is started.

Note that an example of the timer unit 11 in each of the first and second embodiments that have been described with reference to FIG. 4 and FIG. 6 above corresponds to a timer unit which is obtained by removing the subtractor 112 and the comparator 114 from the timer unit of the third embodiment illustrated in FIG. 11 and in which the output Srs1 of the comparator 113 is set as the reception start signal Srs.

In the third embodiment, as the reception start signal Srs, the output Srs2 of the comparator 114 is used, and the output Srs1 of the comparator 113 is used as a clock input of the first latch 121 and a signal of another circuit in the receiving device 1.

In the third embodiment, the margin β is subtracted from the timer setting value Vst by the subtractor 112 and an output of the subtractor 112 is input to the comparator 114, and thereby, the reception start signal Srs2 with which a sleep time corresponding to Vst=Vs+α−β may be ensured is generated.

That is, as illustrated in FIG. 12, the reception start signal Srs2 in the third embodiment is output (changed from "L" to "H"), for example, the margin β (two clocks) earlier than the reception start signal Srs in the first embodiment.

Specifically, for example, a signal D that rises at an 18th clock based on the timer setting value Vs and the counter value Vc output from the counter 111 are input to the comparator 113, and the output Srs1 of the comparator 113 rises from "L" to "H" at the 18th clock.

For example, the signal D that is obtained by subtracting the margin β corresponding to two clocks from the timer setting initial value Vst by the subtractor 112 and rises at a 16th clock and the counter value Vc output from the counter 111 are input to the comparator 114. Accordingly, the output Srs2 of the comparator 114 rises from "L" to "H" at the 16th clock. Note that it is needless to say that the subtractor 112 may be replaced with an adder.

As described above, a value (a clock number) of the margin β may be changed, for example, by a higher-level processor in accordance with a surrounding noise environment and the like. Also, the output Srs1 of the comparator 113 and the output Srs2 of the comparator 114 may be switched around, and for example, one of the output Srs1 and the output Srs2 may be selected and used as a reception start signal (Srs) in accordance with a noise environment and the like.

Furthermore, for example, a plurality of pairs of the subtractor 112 and the comparator 114 may be provided, different margins β1, β2, . . . may be set to the plurality of pairs, and thus, a margin in a reception start signal (Srs) may be controlled, as appropriate. As described above, the timer unit 11 illustrated in FIG. 11 is merely an example, and it is needless to say that various modifications and changes may be made.

Figure 13:
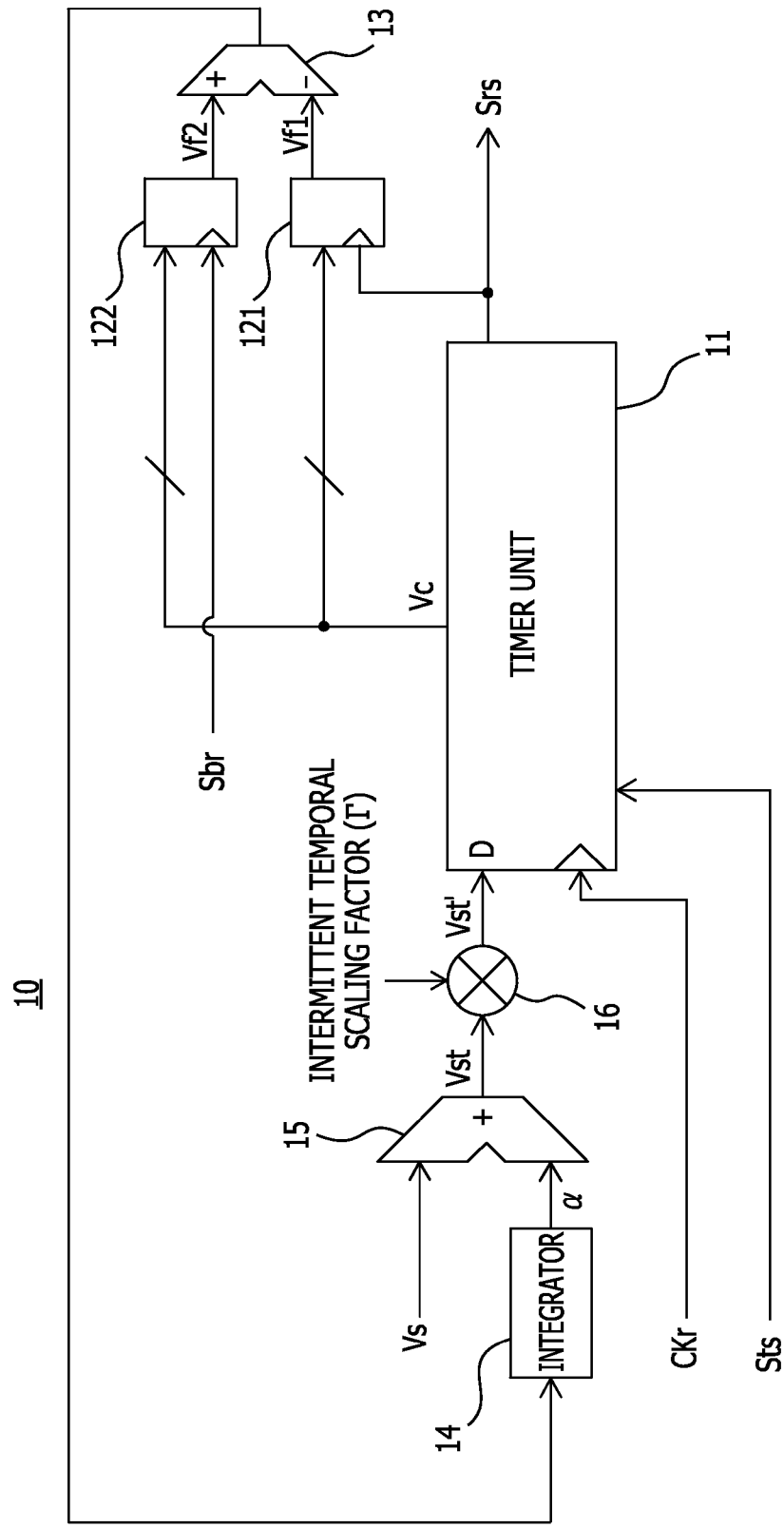
FIG. 13 is a block diagram illustrating a start-up time adjustment circuit of a receiving device in a fourth embodiment.

FIG. 13 is a block diagram illustrating a start-up time adjustment circuit of a receiving device in a fourth embodiment, and illustrates an example in which the interval of the beacon BN is irregular (are not regular). Also, FIG. 14 is a chart illustrating an operation of the start-up time adjustment circuit illustrated in FIG. 13, and FIG. 15 is a chart illustrating an intermittent temporal scaling factor used in the start-up time adjustment circuit illustrated in FIG. 13.

Figure 14:
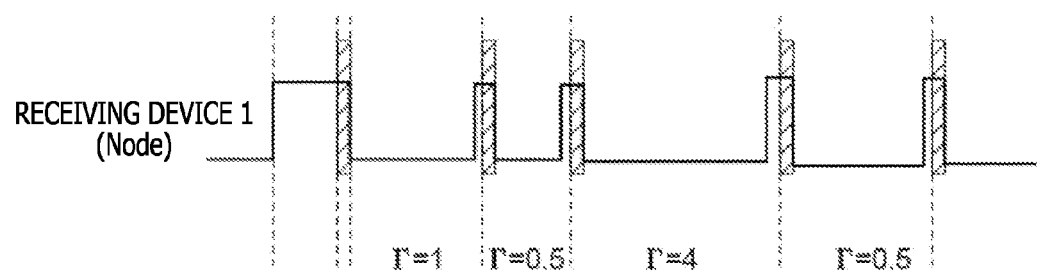
FIG. 14 is a chart illustrating an operation of the start-up time adjustment circuit illustrated in FIG. 13.
Figure 15:
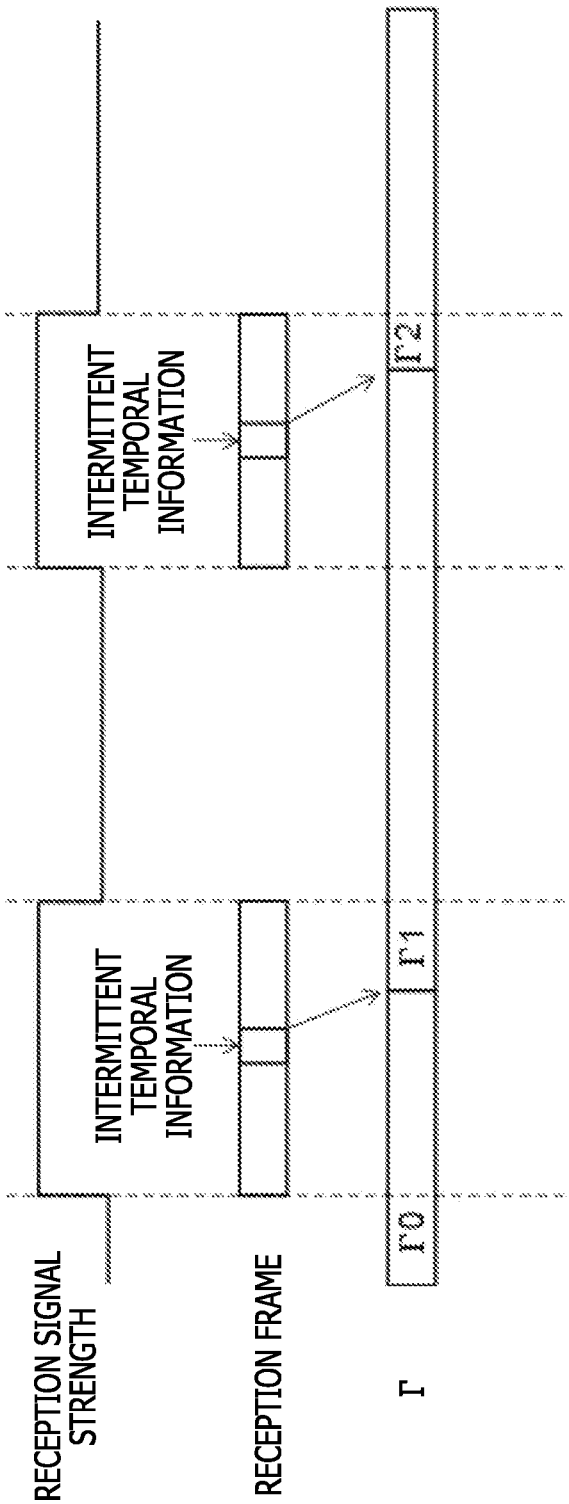
FIG. 15 is a chart illustrating an intermittent temporal scaling factor used in the start-up time adjustment circuit illustrated in FIG. 13.

The fourth embodiment illustrates an example in which, as illustrated in FIG. 14, the interval of the beacon BN changes in accordance with an intermittent temporal scaling factor $\Gamma$. Also, as illustrated in FIG. 15, the time interval of a beacon (BN2) is included in a reception frame of a beacon (BN1) received (transmitted) immediately previously.

That is, for example, the intermittent temporal scaling factor $\Gamma$ is included in a beacon frame (a reception frame) immediately before the timer unit 11 is started up by the timer start signal Sts, is thus transmitted from the transmitting device (the base station) 2 to the receiving device (the terminal) 1, and $\Gamma$ ($\Gamma_1, \Gamma_2, \ldots$) is set. Note that an initial value ($\Gamma_0$) of the intermittent temporal scaling factor $\Gamma$ is set in advance.

As clearly indicated by a comparison of FIG. 13 with FIG. 4 described above, in the fourth embodiment, a multiplier 16 is inserted between the adder 15 and the timer unit 11. The multiplier 16 receives the output (the timer setting value) Vst of the adder 15, multiplies the output Vst by the intermittent temporal scaling factor $\Gamma$, and outputs a timer setting value Vst' to the timer unit 11. Note that it is needless to say that the above-described second embodiment and third embodiment may be applied to the fourth embodiment.

Figure 16:
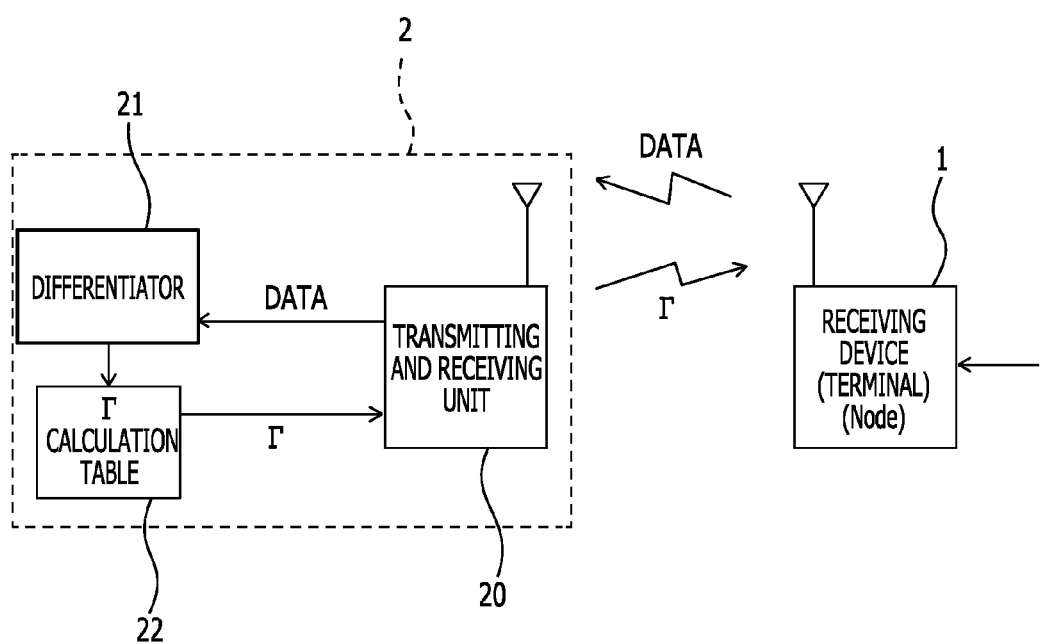
FIG. 16 is a diagram schematically illustrating an example of a transmitting and receiving system to which the receiving device of the fourth embodiment is applied.

FIG. 16 is a diagram schematically illustrating an example of a transmitting and receiving system to which the receiving device of the fourth embodiment is applied, and illustrates an example of a wireless transmitting and receiving system that variably controls the intermittent temporal scaling factor $\Gamma$. As illustrated in FIG. 16, a transmitting and receiving unit 20, a differentiator 21, and a $\Gamma$ calculation table (a $\Gamma$ calculation unit) 22 are provided in the transmitting device (a base station) 2. Note that it is needless to say that the F calculation table 22 is not limited to a table.

The transmitting and receiving unit 20 transmits the transmission waves BN1, BN2, . . . to the receiving device (the terminal) 1, receives data output from the terminal 1, and then processes the data, and the differentiator 21 differentiates the data received from the terminal 1 via the transmitting and receiving unit 20.

The $\Gamma$ calculation table 22 controls, based on an output of the differentiator 21, the intermittent temporal scaling factor $\Gamma$, and transmits the intermittent temporal scaling factor $\Gamma$ to the terminal 1 via the transmitting and receiving unit 20. The intermittent temporal scaling factor $\Gamma$ is calculated with the $\Gamma$ calculation table 22 such that, when an absolute value of an output (a differential value) of the differentiator 21 is large, the intermittent temporal scaling factor $\Gamma$ is small.

That is, for example, if a change of data is rapid, an intermittent time of a beacon is reduced and control is performed such that an execution data rate is increased, and if a change of data is moderate, an intermittent time of a beacon is increased and control is performed such that an execution data rate is reduced.

Thus, an optimal data rate based on a data change may be set, power consumption may be reduced, so that the lifetime of a battery may be further increased.

Figure 17:
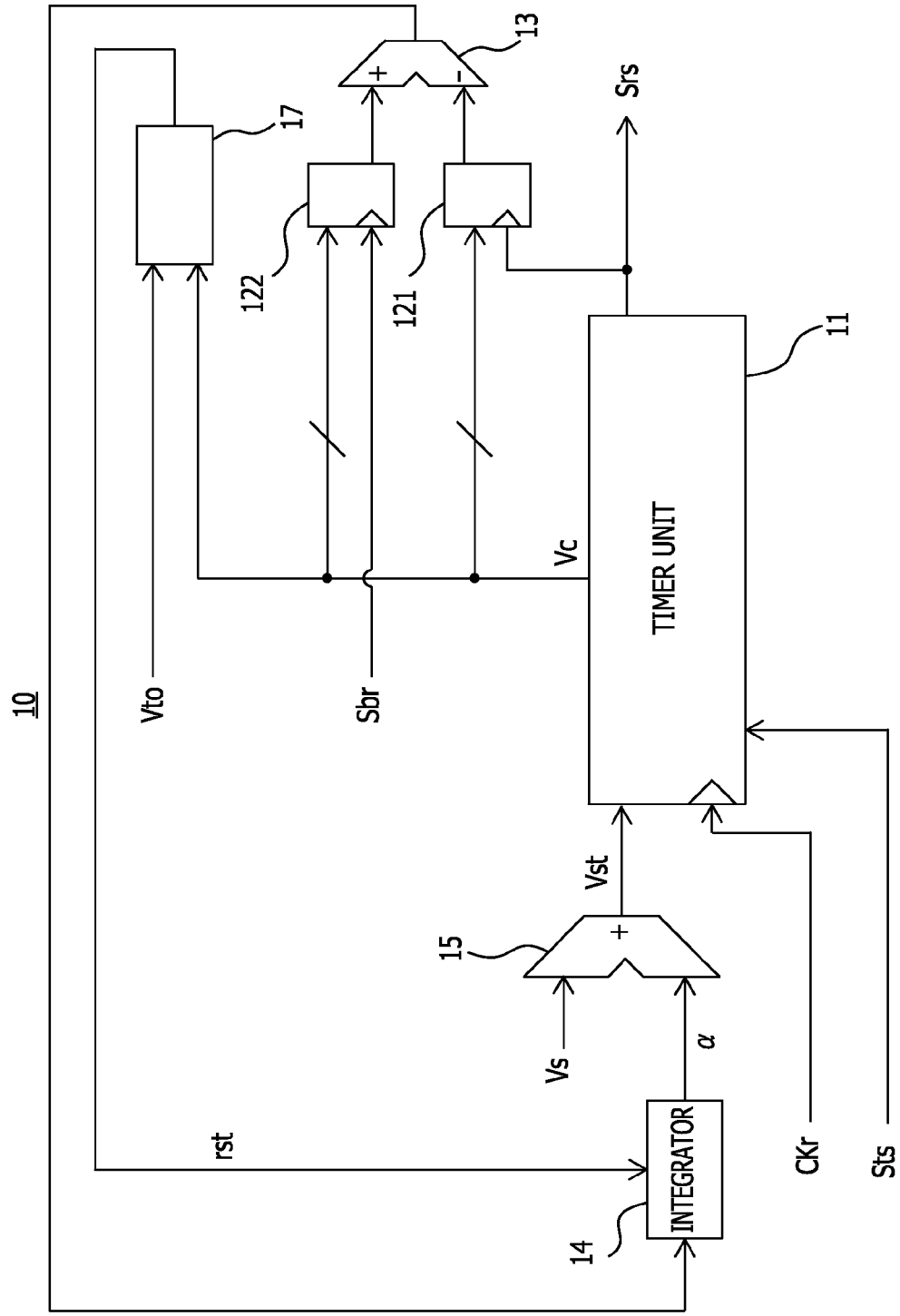
FIG. 17 is a block diagram illustrating a start-up time adjustment circuit of a receiving device in a fifth embodiment.

FIG. 17 is a block diagram illustrating a start-up time adjustment circuit of a receiving device in a fifth embodiment. As clearly indicated by a comparison of FIG. 17 with FIG. 4 described above, in the fifth embodiment, a comparator 17 that receives the counter value Vc output from the timer unit 11 and a time out setting value Vto and compares the counter value Vc and the time out setting value Vto with each other is added.

That is, the comparator 17 is configured to output, when the counter value Vc output from the timer unit 11 is the time out setting value Vto, a reset signal rst to the integrator 14 to reset an integral value.

In this case, the timer setting initial value Vs given to the adder 15 is set, for example, based on a shortest sleep time, and there is a probability that, when correction is performed with the offset value α and thus the sleep time is extended, the receiving device 1 may possibly fail to receive the beacon BN.

Considering the above-described situation, the time out setting value Vto is set in advance and, if the beacon reception signal Sbr is not output even when the counter value Vc is the time out setting value Vto, the integrator 14 is reset by the reset signal rst output from the comparator 17.

Thus, similar to when the first beacon BN1 is received, the timer setting initial value Vs is output as the timer setting value Vst from the adder 15, and a start-up is performed earlier, based on the shortest sleep time.

Figure 18:
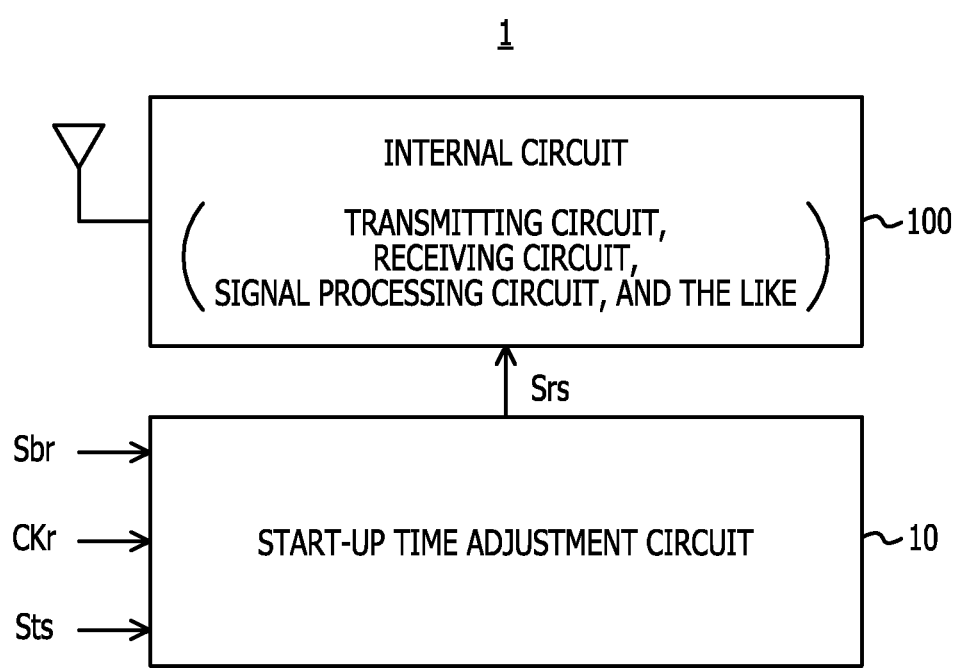
FIG. 18 is a block diagram illustrating an entire configuration of a receiving device according to an embodiment.

FIG. 18 is a block diagram illustrating an entire configuration of a receiving device according to this embodiment. As illustrated in FIG. 18, the receiving device 1 includes the start-up time adjustment circuit 10 and the internal circuit 100. In this case, the internal circuit 100 includes a transmitting circuit, a receiving circuit, a signal processing circuit, and the like, and on (an active state) and off (a sleep state) thereof are controlled based on the reception start signal Srs output from the start-up time adjustment circuit 10.

FIG. 18 is a block diagram illustrating an entire configuration of a receiving device according to this embodiment. As illustrated in FIG. 18, the receiving device 1 includes the start-up time adjustment circuit 10 and the internal circuit 100. As described above, the beacon reception signal Sbr, the reference clock CKr, and the timer start signal Sts are input to the start-up time adjustment circuit 10, and the reception start signal Srs is output to the internal circuit 100.

In this case, the internal circuit 100 includes a transmitting circuit, a receiving circuit, a signal processing circuit, and the like, and on (an active state) and off (a sleep state) thereof are controlled based on the reception start signal Srs output from the start-up time adjustment circuit 10. Also, as the beacon reception signal Sb, a signal output from the internal circuit 100 that has been started up is used.

Note that, although not illustrated in FIG. 18, for example, when the receiving device 1 is used as a terminal of a wireless network for a sensor, the internal circuit 100 includes various devices and circuits, such as a sensor and a memory, which are used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device which receives a plurality of signals transmitted at time intervals, the communication device comprising:
   a receiving circuit configured to receive the plurality of signals; and
   a start-up time adjustment circuit configured to transmit, to the receiving circuit, a start signal that instructs a change from a sleep state to an active state,
   wherein:
      the start-up time adjustment circuit is configured to:
      transmit, to the receiving circuit, a first start signal that instructs a change from the sleep state to the active state at a first time earlier than a second time when a first signal among the plurality of signals reaches the communication device,
      measure a first time difference between the second time and the first time,
      determine, based on the first time difference, a third time that is a time after a time when the receiving circuit is changed from the active state to the sleep state, and
      transmit a second start signal that instructs a change from the sleep state to the active state to the receiving circuit at the third time, and
      the receiving circuit is configured to detect the reception of the plurality of signals based on at least one of a frame synchronization signal obtained by modulating the plurality of signals, an output signal of a reception signal strength detector provided in the communication device, and an output signal of an energy detector provided in the communication device.

2. The communication device according to claim 1, wherein the start-up time adjustment circuit includes:
   a timer unit configured to count a reference clock, based on a timer setting value, and output the start signal,
   a first latch configured to hold, based on the start signal, the timer setting value or a counter value of the timer unit,
   a second latch configured to hold, based on the plurality of signals, the counter value of the timer unit,
   a subtractor configured to subtract a value held by the first latch from a value held by the second latch,
   an integrator configured to integrate an operation result of the subtractor, and
   a first adder configured to add the operation result of the integrator and the timer setting value.

3. The communication device according to claim 2, wherein the start-up time adjustment circuit is configured to:
   set, in receiving the first signal, the timer setting value that is input to the timer unit as a timer setting initial value based on a shortest sleep time; and
   set, in receiving one of second and subsequent signals among the plurality of signals, which is transmitted next after the first signal, the timer setting value that is input to the timer unit as a value obtained by adding the timer setting initial value and an output of the integrator by the first adder.

4. The communication device according to claim 2, wherein in receiving a second signal among the plurality of signals, which is transmitted after the first signal, the start-up time adjustment circuit uses, as the timer setting value that is input to the timer unit, an output of the first adder when an immediately previous signal is received.

5. The communication device according to claim 2, wherein:
   the timer unit includes:
   a counter configured to count the reference clock and output the counter value, and
   a first comparator configured to compare the counter value with the timer setting value and generate a first timer output signal; and the first timer output signal is used as the start signal.

6. The communication device according to claim 5, wherein:
   the timer unit includes:
   a subtractor configured to subtract a margin from the timer setting value or a second adder configured to add a margin to the timer setting value, and
   a second comparator configured to compare the counter value with an output value of the subtractor and generate a second timer output signal; and
   the second timer output signal is used as the start signal.

7. The communication device according to claim 2, wherein the start-up time adjustment circuit includes:
   a multiplier inserted between the first adder and the timer unit and configured to multiply an output value of the adder by an intermittent temporal scaling factor, and
   an output value of the multiplier is set as the timer setting value.

8. The communication device according to claim 7, wherein:
   the intermittent temporal scaling factor is included in a frame of a third signal among the plurality of signals, which is transmitted immediately before the first signal, and
   the start-up time adjustment circuit determines the timer setting value in receiving the first signal after the third signal using the intermittent temporal scaling factor.

9. A method that is to be executed using a communication device including a receiving circuit configured to receive a plurality of signals transmitted at time intervals, the method comprising:
   changing the receiving circuit from a sleep state to an active state at a first time earlier than a second time when a first signal among the plurality of signals is input to the communication device;
   receiving the first signal with the receiving circuit in the active state;
   changing, after the first signal is received by the receiving circuit, the receiving circuit from the active state to the sleep state;
   measuring a first time difference between the second time of the first signal and the first time;
   determining, based on the first time difference, a third time that is a time after the receiving circuit is changed from the sleep state to the active state; and
   changing the receiving circuit from the sleep state to the active state at the second time, wherein the receiving circuit is configured to detect the reception of the first signal based on at least one of a frame synchronization signal obtained by modulating the plurality of signals, an output signal of a reception signal strength detector provided in the communication device, and an output signal of an energy detector provided in the communication device.

10. A communication system comprising:
a transmitting device configured to transmit a plurality of signals at time intervals; and
a receiving device configured to receive the plurality of signals,
wherein the receiving device includes:
   a receiving circuit configured to receive the plurality of signals, and
   a start-up time adjustment circuit configured to transmit, to the receiving circuit, a start signal that instructs a change from a sleep state to an active state, and
wherein:
   a first start signal that instructs a change from the sleep state to the active state is transmitted to the receiving circuit at a first time earlier than a second time when a first signal among the plurality of signals is input to the receiving device,
   a first time difference between the second time and the first time is measured,
   a third time that is a time after the receiving circuit is changed from the active state to the sleep state is determined based on the first time difference,
   a second start signal that instructs a change from the sleep state to the active state is transmitted to the receiving circuit at the second time,
   the transmitting device receives data from the receiving device and processes the data, and
   the receiving circuit is configured to detect the reception of the plurality of signals based on at least one of a frame synchronization signal obtained by modulating the plurality of signals, an output signal of a reception signal strength detector provided in the communication device, and an output signal of an energy detector provided in the communication device.

11. The communication system according to claim 10, wherein:
   the transmitting device is a base station of a wireless transmitting and receiving system,
   the receiving device is a terminal device of a wireless transmitting and receiving system, and
   the base station includes:
      a transmitting and receiving circuit configured to transmit the signal to the terminal device, receive data from the terminal device, and process the data;
      a differentiation circuit configured to differentiate data from the terminal device, which is received via the transmission and receiving circuit; and
      a calculation circuit configured to, based on an output of the differentiation circuit, control an intermittent temporal scaling factor and transmit the intermittent scaling factor to the terminal via the transmission and receiving circuit.

12. The communication system according to claim 11, wherein the calculation circuit is configured to control a transmission interval of the signal, based on the degree of a change of data received from the terminal device.

13. A communication device configured to receive a plurality of signals transmitted at time intervals, the communication device comprising:
   a receiving circuit configured to receive the plurality of signals; and
   a start-up time adjustment circuit configured to transmit, to the receiving circuit, a start signal that instructs a change from a sleep state to an active state,
wherein the start-up time adjustment circuit is configured to:
   transmit, to the receiving circuit, a first start signal that instructs a change from the sleep state to the active state at a first time earlier than a second time when a first signal among the plurality of signals reaches the communication device;
   measure a first time difference between the second time and the first time;
   determine, based on the first time difference, a third time that is a time after a time when the receiving circuit is changed from the active state to the sleep state; and
   transmit a second start signal that instructs a change from the sleep state to the active state to the receiving circuit at the third time, and
wherein the start-up time adjustment circuit includes:
   a timer unit configured to count a reference clock, based on a timer setting value, and output the start signal;
   a first latch configured to hold, based on the start signal, the timer setting value or a counter value of the timer unit;
   a second latch configured to hold, based on the plurality of signals, the counter value of the timer unit;
   a subtractor configured to subtract a value held by the first latch from a value held by the second latch;
   an integrator configured to integrate an operation result of the subtractor;
   a first adder configured to add the operation result of the integrator and the timer setting value; and
   a multiplier inserted between the first adder and the timer unit and configured to multiply an output value of the adder by an intermittent temporal scaling factor, and wherein an output value of the multiplier is set as the timer setting value.

* * * * *